US012394532B2

(12) United States Patent
Tardy et al.

(10) Patent No.: US 12,394,532 B2
(45) Date of Patent: Aug. 19, 2025

(54) STORAGE DEVICE FOR NUCLEAR FUEL ASSEMBLIES

(71) Applicant: ORANO NUCLEAR PACKAGES AND SERVICES, Montigny le Bretonneux (FR)

(72) Inventors: Marcel Tardy, Chatillon (FR); Stéphane Nallet, Le Mesnil Saint Denis (FR)

(73) Assignee: ORANO NUCLEAR PACKAGES AND SERVICES, Montigny le Bretonneux (FR)

( * ) Notice: Subject to any disclaimer, the term of this patent is extended or adjusted under 35 U.S.C. 154(b) by 470 days.

(21) Appl. No.: 17/995,890

(22) PCT Filed: Apr. 8, 2021

(86) PCT No.: PCT/FR2021/050616
§ 371 (c)(1),
(2) Date: Oct. 10, 2022

(87) PCT Pub. No.: WO2021/209700
PCT Pub. Date: Oct. 21, 2021

(65) Prior Publication Data
US 2023/0127068 A1    Apr. 27, 2023

(30) Foreign Application Priority Data
Apr. 14, 2020  (FR) ...................... 2003732

(51) Int. Cl.
*G21C 19/40*    (2006.01)
*G21F 5/012*    (2006.01)
(52) U.S. Cl.
CPC ............. *G21C 19/40* (2013.01); *G21F 5/012* (2013.01)

(58) Field of Classification Search
CPC . G21F 5/06; G21F 5/012; G21F 5/008; G21C 19/40; G21C 19/07
(Continued)

(56) References Cited

U.S. PATENT DOCUMENTS 10,784,007 B2 *  9/2020  Delage ................... G21C 19/07
12,119,127 B2 * 10/2024  Tardy ..................... G21F 5/008
(Continued)

FOREIGN PATENT DOCUMENTS

EP    0158849 A1   10/1985
FR    2855311 A1   11/2004
(Continued)

OTHER PUBLICATIONS

Office Action for Japanese Application No. 2022-562553 dated Nov. 25, 2024.
(Continued)

*Primary Examiner* — Jack W Keith
*Assistant Examiner* — Daniel Wasil
(74) *Attorney, Agent, or Firm* — McDonald Hopkins LLC

(57) ABSTRACT

A storage device for transporting and/or storing nuclear fuel assemblies. The device includes a plurality of transverse structures separated by spacers. Sleeves pass through openings of at least one of the transverse structures. Each sleeve is made from flat structures and forms a housing that can receive a fuel assembly. At least one of these sleeves has an inner recess-delimiting surface formed in part by an inner surface of a first flat structure made with boron and an inner surface of a second flat structure made without boron.

15 Claims, 5 Drawing Sheets

(58) Field of Classification Search
USPC .......................................................... 376/272
See application file for complete search history.

(56) References Cited

U.S. PATENT DOCUMENTS

2009/0207962 A1* 8/2009 Maeda ................... G21C 19/40
                                                            376/272
2018/0308595 A1* 10/2018 Tardy ..................... G21C 19/40
2020/0350089 A1   11/2020 Delage

FOREIGN PATENT DOCUMENTS

| FR | 3054922 A1    | 2/2018 |
| JP | 2001-235588 A | 8/2001 |
| JP | 2008-096338 A | 4/2008 |
| WO | 2019-145627 A1| 8/2019 |

OTHER PUBLICATIONS

Search Report for French application No. 2003732 dated Dec. 8, 2020.
International Search Report for PCT/FR2021/050616 dated Aug. 3, 2021.
Written Opinion for PCT/FR2021/050616 dated Jul. 23, 2021.

* cited by examiner

STORAGE DEVICE FOR NUCLEAR FUEL ASSEMBLIES

CROSS-REFERENCE TO RELATED APPLICATIONS

This is the National Stage of PCT international application PCT/FR2021/050616, filed on Apr. 8, 2021, which claims the priority of French Patent Application No. 2003732, filed Apr. 14, 2020, both of which are incorporated herein by reference in their entirety.

TECHNICAL FIELD

The present invention is concerned with the field of transport and/or storage of nuclear fuel assemblies, preferably spent assemblies in which the fuel has been irradiated.

PRIOR ART

Such a device, also known as a storage "basket" or "rack", comprises a plurality of adjacent housings each capable of receiving a nuclear fuel assembly.

This storage device, being to be housed in a cavity of a packaging, is designed to be able to fulfil three essential functions simultaneously, which will be briefly set out below. The first is the function of thermal transfer of the heat released by the fuel assemblies. Typically, aluminium or one of its alloys is used because of its good thermal conduction properties.

The second function relates to neutron absorption, and the concern to maintain the subcriticality of the storage device when loaded with fuel assemblies. This is achieved by using neutron absorbing materials, also called neutron poison materials, such as boron. Finally, the third essential function is related to the mechanical strength of the device. It is noted that the overall mechanical strength of the device should be compatible with regulatory safety requirements for transporting/storing nuclear materials, especially with regard to the so-called "free fall" tests.

From prior art, several ways of forming the basket are known. One is to provide transverse structures, such as wafers, spaced apart from each other by spacers, along the longitudinal direction of the basket. In addition, longitudinally oriented sleeves pass through the transverse structures, each forming a housing for receiving a nuclear fuel assembly.

The sleeves are formed using flats succeeding one another in the circumferential direction of the sleeve. These flats can all be made using a same aluminium-based material, comprising a boron density in order to fulfil the neutron absorption function, and to achieve the desired effective multiplication factor "Keff".

However, the production of such flats with boron is particularly expensive, strongly impacting overall production cost of the storage device.

DISCLOSURE OF THE INVENTION

The purpose of the invention is therefore to remedy the above-mentioned drawback relating to embodiments of prior art.

To this end, one object of the invention is a storage device for transporting and/or storing nuclear fuel assemblies, the storage device being to be housed in the cavity of a packaging for transporting and/or storing nuclear fuel assemblies, and including a number N of adjacent housings, each being to receive a nuclear fuel assembly, the storage device comprising a plurality of transverse structures spaced apart from each other along a longitudinal direction of the storage device, using a plurality of spacers arranged between these transverse structures, the storage device also comprising sleeves forming the N adjacent housings respectively, each sleeve passing through an opening of at least one of the plurality of transverse structures, and preferably of at least several of them, each sleeve being made by flats succeeding one another along a peripheral direction of the sleeve, each flat being arranged parallel or substantially parallel to a longitudinal axis of the housing defined internally by the sleeve.

According to the invention, in at least one transverse plane of the storage device passing through the N sleeves, and preferably in several distinct transverse planes, at least one of these sleeves, and preferably each of at least one plurality of sleeves among these N sleeves, has an internal housing delimitation surface partly formed by:
    an internal surface of a first flat made with boron; and
    an internal surface of a second flat made without boron.

The originality of the invention lies in the heterogeneity of the flats forming a same sleeve delimiting a housing for receiving a nuclear fuel assembly, in particular by providing at least one second flat made without boron. This principle results from an unexpected observation. Indeed, the manufacturing cost is greatly reduced when the sleeve is made with non-boronated flats and with other flats having a certain boron content, in comparison with a conventional solution resulting in the same effective multiplication factor, and where all the flats contain boron in a content lower than said certain above-mentioned boron content. In other words, the invention provides for the combination of non-boronated flats and boronated flats with a boron content higher than the homogeneous content provided in a solution with equivalent performance in prior art.

This principle advantageously contributes to reducing production costs of storage devices, while having high performance from a criticality point of view.

The invention also provides for at least one of the following optional characteristics, taken alone or in combination.

In a transverse plane or in each of a plurality of transverse planes of the storage device each passing through the N sleeves, at least 30% of the N sleeves each have an internal housing delimitation surface partly formed by:
    an internal surface of a first flat made with boron; and
    an internal surface of a second flat made without boron.

Even more preferably, this characteristic, as well as all of the essential and optional characteristics of the invention, are preferably observed in all or substantially all of the transverse planes of the storage device that pass through the sleeves.

Preferably, the N sleeves are divided into sleeves delimiting peripheral housings and sleeves delimiting internal housings, and in a transverse plane or in each of a plurality of transverse planes of the storage device each passing through the N sleeves, at least 50% of the sleeves delimiting peripheral housings each have an internal housing delimitation surface partly formed by:
    an internal surface of a first flat made with boron; and
    an internal surface of a second flat made without boron.

Preferably, in a transverse plane or in each of a plurality of transverse planes of the storage device each passing through the N sleeves, at least one of those sleeves, and preferably each of a plurality of sleeves among those N sleeves, has an internal housing delimitation surface having a generally square or rectangular cross-section, and formed by:
- an internal surface of a first flat made with boron;
- an internal surface of a second flat made without boron; and
- two other flats, and the first flat, the second flat and the other two flats respectively form the four sides of the internal housing delimitation surface having a generally square or rectangular cross-section.

Preferably, said other two flats are formed respectively by:
- two first flats made with boron; or
- two second flats made without boron; or
- a first flat made with boron and a second flat made without boron.

Preferably, the flats forming the N sleeves are either first flats made with boron, preferably with a same boron content, or second flats made without boron.

Preferably, at least one first flat is made in one-piece, preferably from an aluminium alloy comprising boron, and/or at least one first flat is provided with a coating comprising boron, preferably applied to an aluminium alloy material.

Preferably, at least one second flat is made with a boron-free aluminium alloy.

Preferably, the sleeves each extend over the full height of the storage device or substantially over this full height, with each flat continuously extending over the full height of the storage device or substantially over this full height, or alternatively being cut longitudinally into sections to form adjacent longitudinal sections of sleeve. When the flats are cut into sections, the longitudinal sections forming a same flat preferably all have the same boron content, or are all boron-free. Alternative solutions exist, such as providing several longitudinal sections with different boron contents within a same flat, and/or providing several longitudinal sections within a same flat, some of which have boron and others of which are boron-free.

In any case, the boron content in the first flats highly preferably remains constant within the whole storage device, for cost reasons.

Preferably, in the cut into sections design, at least one of the longitudinal sections of sleeve is axially bearing on one of the transverse structures of the storage device.

Preferably, the transverse structures are wafers each pierced with N openings for receiving the N sleeves, respectively, the wafers preferably being made without boron.

Preferably, the storage device comprises tie rods for mechanically holding the stack of transverse structures and spacers along the longitudinal direction.

Preferably, the number of transverse structures, longitudinally spaced from each other, is greater than five, and preferably greater than ten.

One object of the invention is also a packaging for storing and/or transporting nuclear fuel assemblies, the packaging comprising a cavity in which a storage device as described above is housed.

Finally, one object of the invention is a package comprising such a packaging, as well as nuclear fuel assemblies arranged in the adjacent housings of the storage device of this packaging.

Further advantages and characteristics of the invention will become apparent from the non-limiting detailed description below.

BRIEF DESCRIPTION OF THE DRAWINGS

This description will be made with reference to the attached drawings, among which.

DETAILED DISCLOSURE OF PREFERRED EMBODIMENTS

Figure 1:
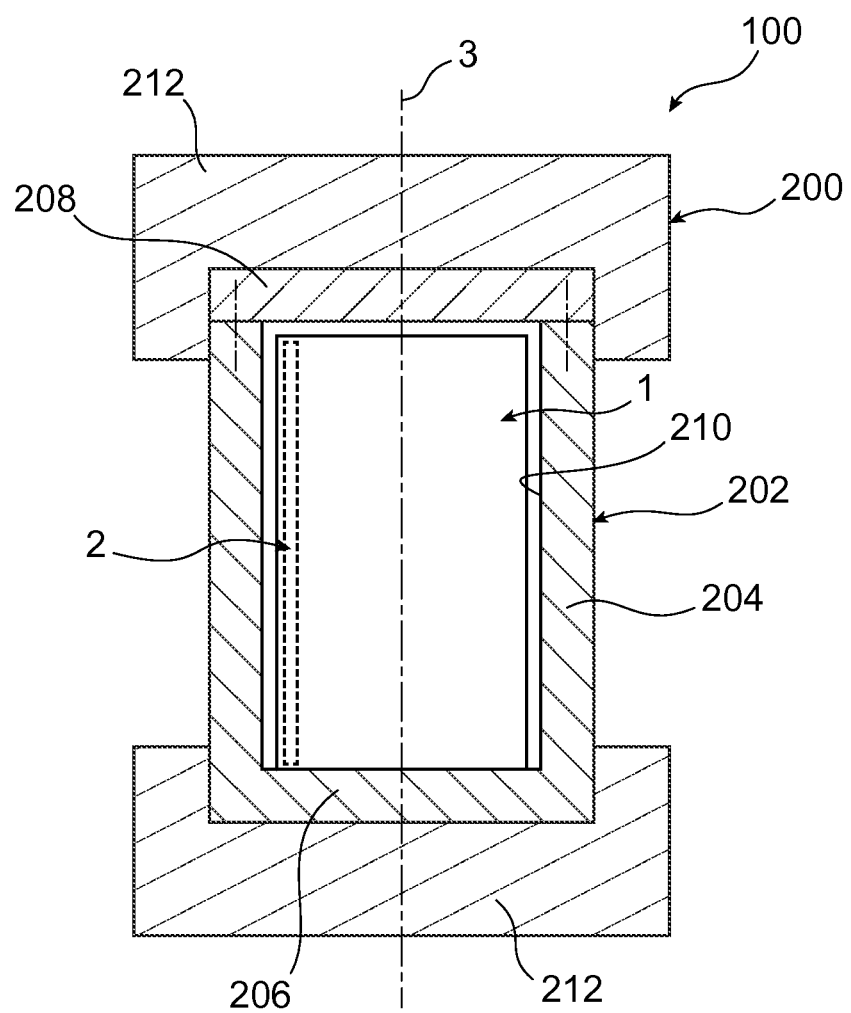
FIG. 1 represents a schematic cross section view of a package according to the invention, comprising in particular a storage device for storing and/or transporting nuclear fuel assemblies.
Figure 2:
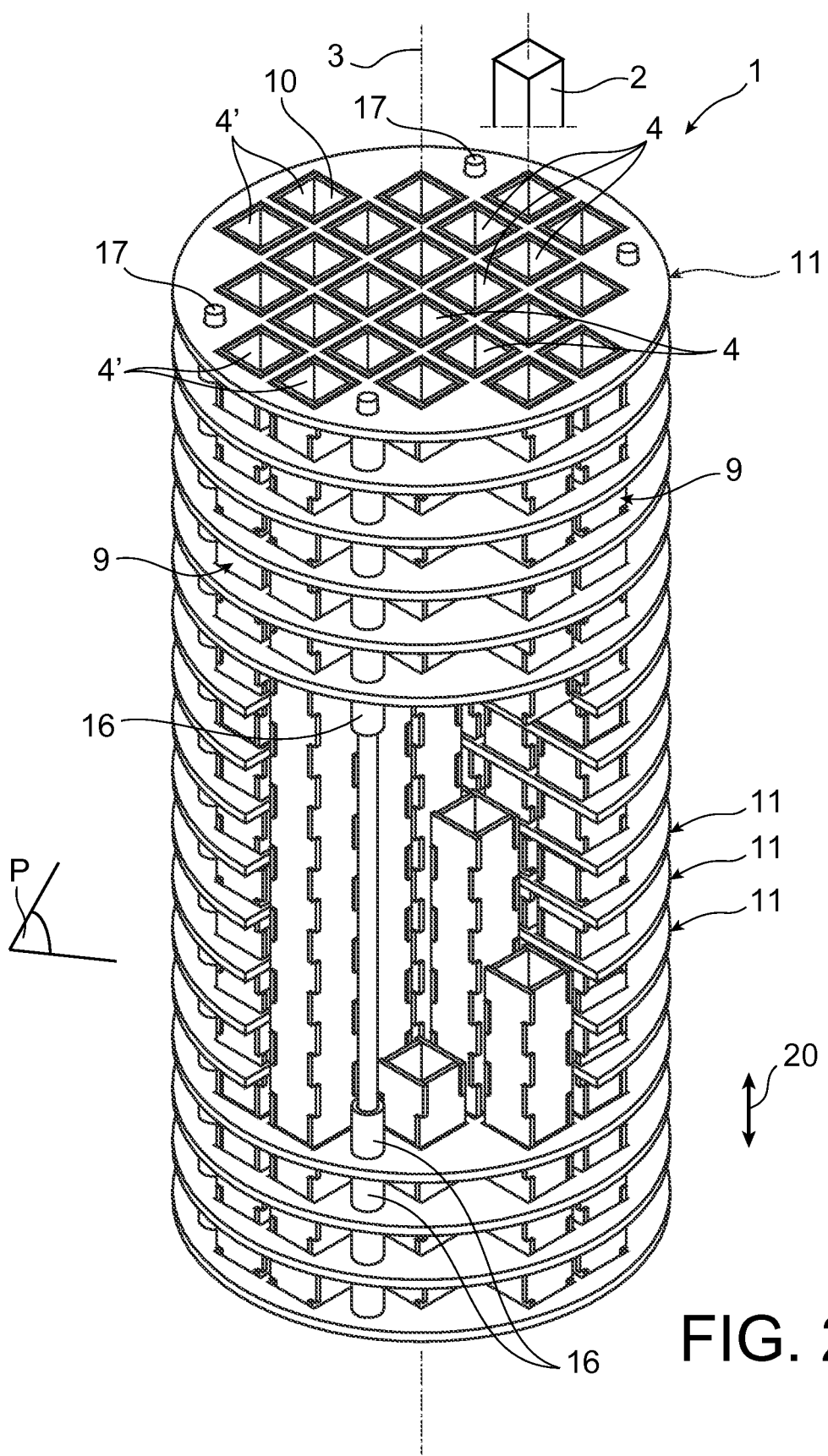
FIG. 2 represents a partial perspective view of the storage device, according to one preferred embodiment of the present invention.

With reference to FIG. 1, a package 100 comprising a packaging 200 for storing and/or transporting irradiated nuclear fuel assemblies 2 is represented. The packaging 200 has a body 202 formed by a side body 204, a bottom 206, and a removable lid 208. The bottom 206 and the lid 208 are spaced apart from each other along the central longitudinal axis 3 of the packaging, around which the side body 204 extends.

The packaging 200 defines inside its body a cavity 210, in which a storage device 1, which will be referred to as a "basket" in the following description, is housed. As will be detailed below, the basket 1 comprises a plurality of adjacent housings each being to receive one of the nuclear fuel assemblies 2. When the basket 1 is housed in the cavity 210 of the packaging 200, and the nuclear fuel assemblies 2 are placed in the adjacent housings of the basket 1, the package 100 is said to be "loaded".

By way of indication, it is noted that at the axial ends of the packaging, the packaging may have shock absorbing covers 212, respectively covering the lid 208 and the bottom 206 of the body 202 of this packaging.

The feature of the invention lies in the design of the basket 1 for transporting and/or storing irradiated nuclear fuel assemblies, which will now be described with reference first to FIGS. 2 to 5.

The basket 1 comprises a plurality of adjacent housings 4, 4' arranged parallel to the axis 3, the latter also corresponding to the central longitudinal axis of the basket 1.

The number N of adjacent housings is here twenty-four, but this number could of course differ, for example between ten and one hundred.

The housings 4, 4' are each capable of receiving at least one fuel assembly 2 of square cross-section, and preferably only one. As a result, they each have an internal housing delimitation surface 10, having a generally square or rectangular cross-section. By "internal housing delimitation surface 10" it is meant the surface of the basket elements that directly faces the external surface of the fuel assemblies 2, as has been represented for one of them in FIG. 3.

The housings 4, 4' are therefore provided so as to be juxtaposed to each other. They are each made by a sleeve 9, being provided in the same number N. Each sleeve 9, parallel to the axis 3, extends over the full height of the basket 1 along the longitudinal direction 20 of the latter, or substantially over this full height.

It is therefore the N sleeves 9 which form the N housings 4, 4', among which a number N1 of peripheral housings 4', as well as a number N2 of internal housings 4. Here, there are twelve peripheral housings 4', and twelve internal housings 4, but their numbers may of course differ, without departing from the scope of the invention. By "peripheral housings", it is meant housings through which a fictitious peripheral line of the basket 1 passes, and defining a closed peripheral row of housings 4', in which the internal housings 4 are circumscribed. Thus, the N1 peripheral housings 4' are here divided into four peripheral segments of two housings 4', and into four housings 4' each defined by a sleeve 9 arranged between the ends of said peripheral segments.

The making of the N sleeves 9 is specific to the present invention, and will be described in detail subsequently.

To complete the design of the basket 1, the latter includes a plurality of transverse structures 11, spaced from each other along the direction 20. The transverse structures 11 are planar or substantially planar structures, arranged orthogonally to the axis 3. Each of these structures 11 is in the general shape of a disc or wafer and is pierced with N openings 13 for respectively receiving the N sleeves 9. In other words, the same sleeve 9 successively passes through an opening 13 of each of the wafers 11 of the basket 1.

The wafers 11 are for example made of steel or a metal alloy, for example an aluminium alloy, but whatever material is chosen, it is preferably free of boron or of any other neutron poison element, that is free of neutron-absorbing elements. By "neutron-absorbing elements", it is meant elements which have an effective cross-section greater than 100 barns for thermal neutrons. As indicative examples, they are aluminium alloys free of boron, gadolinium, hafnium, cadmium, indium, etc.

Here the number of wafers 11 is preferably between fifteen and twenty-five, although a different number could be adopted. These wafers are longitudinally spaced from each other using spacers 16, several of which are arranged between each pair of wafers 11 directly consecutive in the stack. For example, three to six spacers 16 are provided at each spacing stage between the wafers 11, the spacers of a same stage preferably all having the same height along the direction 20. The spacers 16 are preferably made of steel, but other materials can be contemplated, without departing from the scope of the invention.

The structure of the basket 1 is completed by tie rods 17 which hold the wafers 11 and the spacers 16 against each other in compression along the direction 20. The stack is thus mechanically held together by the tie rods 17 which pass through the wafers 11, and possibly also the spacers 16 by providing a hollow design for the latter. The number of tie rods 17 can then be identical to that of the spacers 16 provided at each spacing stage of the wafers, for example four spacers/tie rods in the embodiment represented in FIGS. 2 to 5. The tie rods 17, of known design, are preferably parallel to the axis 3, or substantially parallel to the latter.

Each of the N sleeves 9 is made using four flats succeeding one another in the circumferential direction of the sleeve, these flats being arranged parallel in twos and oriented parallel to the axis 3, or substantially parallel to the latter. In other words, the four flats of a single sleeve 9 are oriented parallel or substantially parallel to a longitudinal axis (not represented) of the housing 4, 4' defined internally by the sleeve.

Figure 4:
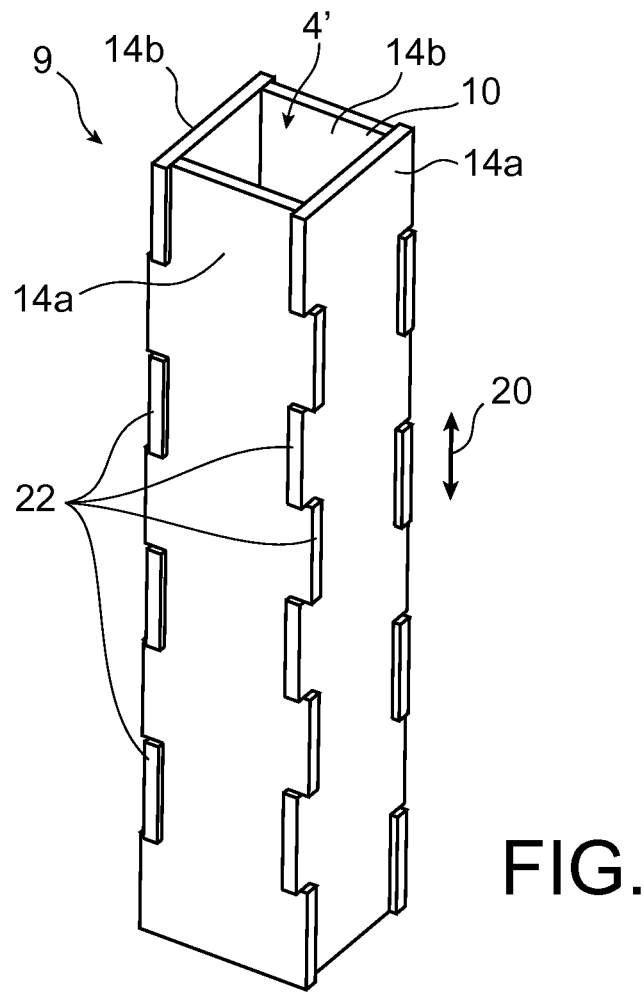
FIG. 4 represents a perspective view of one of the sleeves of the storage device shown in FIGS. 2 and 3.

As is visible in FIG. 4 showing one of the sleeves 9 of the basket, the four flats 14a, 14b are provided with notches 22 at their longitudinal edges, so as to ensure mechanical retention by interlocking. Alternatively, the longitudinal edges of the flats 14a, 14b could, for example, be welded together in twos, without departing from the scope of the invention. These flats 14a, 14b each extend continuously over the full height of the basket, or substantially over this full height.

Figure 3:
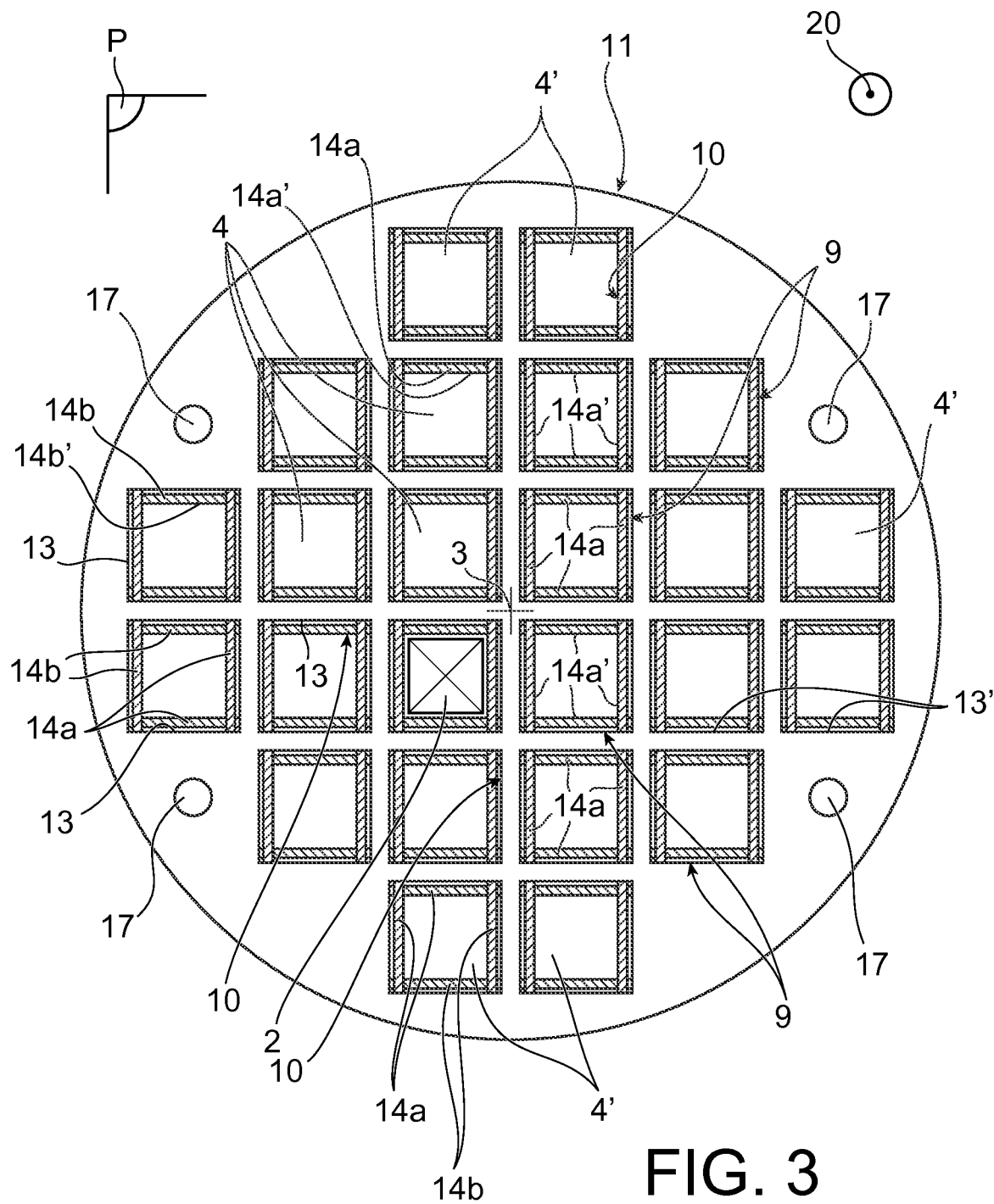
FIG. 3 is a partial transverse cross section view taken along the transverse plane P of FIG. 2.

More specifically with reference to FIG. 3, it is noted that the design of all the sleeves 9 is not necessarily identical. In the preferred embodiment represented, some of the sleeves 9 forming the peripheral housings 4' all have the same design, while other sleeves 9, forming the internal housings 4, also all have an identical design, distinct from that of the sleeves forming the peripheral housings 4'. This principle is given purely by way of illustration, and is not imitative. Indeed, one of the features of the invention lies in the fact that each of a plurality of the N sleeves 9 is made with at least one first flat 14a made with boron and an internal surface 14a' of which forms part of the internal housing delimitation surface 10, and also with at least one second flat 14b made without boron and an internal surface 14b' of which forms another part of this surface 10.

In the following description, preferably all the first flats 14a are made of the same material, just as all the second flats 14b are made of a same material different from that of the first flats. As mentioned above, the first flats 14a comprise boron. They are preferably made in one-piece of an aluminium alloy including boron. The boron may then be distributed in the flat 14a homogeneously or heterogeneously. The boron content in the alloy is adapted according to several criteria such as the desired effective multiplication factor "Keff", the ratio of the number of first flats 14a to the number of second flats 14b, the position of the first flats 14a within the basket, etc. As an indicative example, the mass boron content may be 16% or more in the alloy, but this value may also be lowered to only a few percent.

Alternatively, instead of being in one-piece, each first flat 14a could be a one-piece flat provided with a surface coating comprising boron. In this case, the one-piece flat could be made of an aluminium alloy, and the coating could be deposited by any known technique, such as cold or hot spraying of boron carbide particles.

Preferably, the boron content is identical or substantially identical for all the first flats 14a of the sleeves 9 of the basket 1.

As for the second flats 14b, they are free of boron. They are also free of any other neutron poison element, that is, free of neutron-absorbing elements as understood above. These second flats 14b are also preferably made of an aluminium alloy, but are therefore boron-free.

Figure 5:
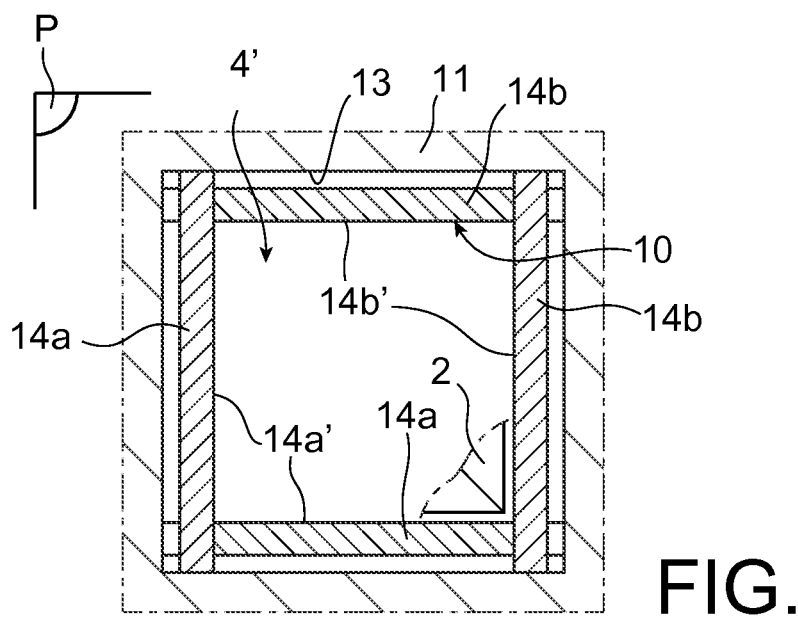
FIG. 5 is an enlarged partial view of that shown in FIG. 3.
Figure 6:
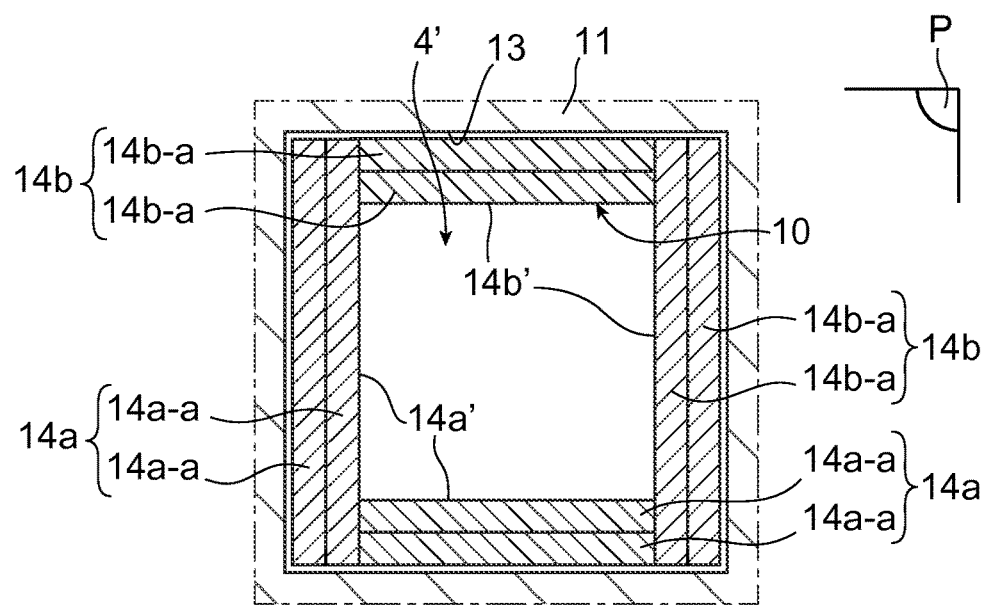
FIG. 6 represents an enlarged partial view similar to that in FIG. 5, with the storage device being in the form of an alternative embodiment of the invention.

In this respect, it is noted that by "flat", it is meant an element of generally planar shape, the thickness of which between its opposite surfaces is of a smaller dimension than each of the dimensions in the other two directions orthogonal to the direction of thickness, and orthogonal to each other. In addition, for each flat of a sleeve 9, it may be a single flat element as shown in FIG. 5, or a superposition of several flat elements, in the thickness direction, as shown in FIG. 6. According to still another alternative, the flat may be a tubular element parallel to the axis 3, enclosing a flat element of complementary cross section. Each flat is preferably solid or substantially solid.

Within the scope of the invention, a judicious choice is therefore made between the first and second flats 14a, 14b for making with each of the sleeves 9 of the basket 1.

Generally speaking, the density of partitions made from the first flats 14a comprising boron is higher in the centre of the basket than at its periphery. Also, the sleeves 9 forming the peripheral housings 4' are made by a combination of first flats 14a comprising boron and second boron-free flats 14b, preferably two of each. On the contrary, the sleeves 9 forming the internal housings 4 are made by only first flats 14a comprising boron. However, some of the sleeves 9 forming the internal housings 4 could comprise one or more second boron-free flats 14b, just as some of the sleeves 9 forming the peripheral housings 4' could comprise only second boron-free flats, without departing from the scope of the invention. Finally, for each sleeve 9 formed by the combination of first flats 14a comprising boron and second boron-free flats 14b, the number of each of them and their relative arrangement may be adapted according to the needs and restrictions encountered.

Returning to the preferred embodiment shown in FIGS. 2 to 5, in at least one transverse plane of the basket 1 such as the section plane P of FIGS. 3 and 5, and preferably in all or substantially all such transverse planes of the basket 1 passing through the sleeves 9, the internal housing delimitation surface 10 of the N2 internal housings 4 is formed by four first flats 14a provided with boron, using their respective internal surfaces 14a'.

Furthermore, still in the section plane(s) considered, the internal housing delimitation surface 10 of the N1 peripheral housings 4' is formed by the combination of two first flats 14a, and two second flats 14b represented in solid lines in FIG. 3.

To further explain the design, reference will be made to the peripheral housing 4' in FIG. 5, in which the fuel assembly 2 has been partially represented. For this housing 4', in the transverse plane of the basket, its internal housing delimitation surface 10 consists of four sides, formed by four line segments respectively. The first side of the internal surface 10 is made by an internal surface 14b' of a second flat 14b. The second side of the internal surface 10, adjacent to the first side, is also made by an internal surface 14b' of a second flat 14b. The third side of the internal surface 10, adjacent to the second side, is made by an internal surface 14a' of a first flat 14a. And finally, the fourth side of the internal surface 10, connecting the first and third sides, is also made by an internal surface 14a' of a first flat 14a.

Thus, although all or part of the housings 4 arranged in proximity to or on the centre of the basket 1 may be made by sleeves obtained solely from first flats 14a, those located further towards the periphery may result from a combination of the first and second flats 14a, 14b.

In the example of the loaded housing 4' in FIG. 5, they are two second boron-free flats 14b, and two first flats 14a comprising boron. Alternatively, for these peripheral housings 4' resulting from a combination of flats of different natures, they could be three second boron-free flats 14b, and a single first flat 14a comprising boron. In the first case, the flats of the same nature could be directly consecutive and orthogonal in twos, or parallel in twos. All these alternative designs are also contemplatable for the sleeves forming the internal housings 4, without departing from the scope of the invention.

Preferably, the combination of flats 14a, 14b of different natures concerns at least 30% of the N housings 4, 4' of the basket, and at least 50% of the peripheral housings 4', even if in the embodiment represented, 100% of the peripheral housings 4' are concerned. By means of this combination of flats 14a, 14b, some of which contain boron and others not, manufacturing costs are reduced while obtaining high performance in terms of maintaining subcriticality.

According to an alternative embodiment represented in FIG. 6, each flat of a sleeve is formed by the superposition of two flat elements. Thus, each first flat 14a is obtained by the superposition of two flat elements 14a-a along the direction of their thickness. In this case, it is the inner flat element that defines the internal surface 14a'. In addition, the two flat elements 14a-a may comprise boron, or only one of them, the one outwardly disposed or the one inwardly disposed. In this case, one of the two flat elements 14a-14a may be made of steel, to reinforce the mechanical strength of the sleeve 9.

A similar design can be provided for the second flats 14b, with the superposition of two flat boron-free elements 14b-a, one of which is made of steel for example. Nevertheless, a second boron-free flat or second boron-free flats 14b may be provided as single flats, in cooperation with a first flat or first flats 14a formed by the superposition of two flat elements 14a-a. The latter solution is, for example, obtained by starting from a boron-free sleeve, for example of steel, and on which one or more flat elements of the sleeve are covered internally or externally with a flat element 14a-a provided with boron. In this embodiment, the sleeve in question may be made as a single piece forming flats succeeding one another along the peripheral direction of the sleeve, or with flats joined to one another by succeeding one another in the same direction.

Figure 7:
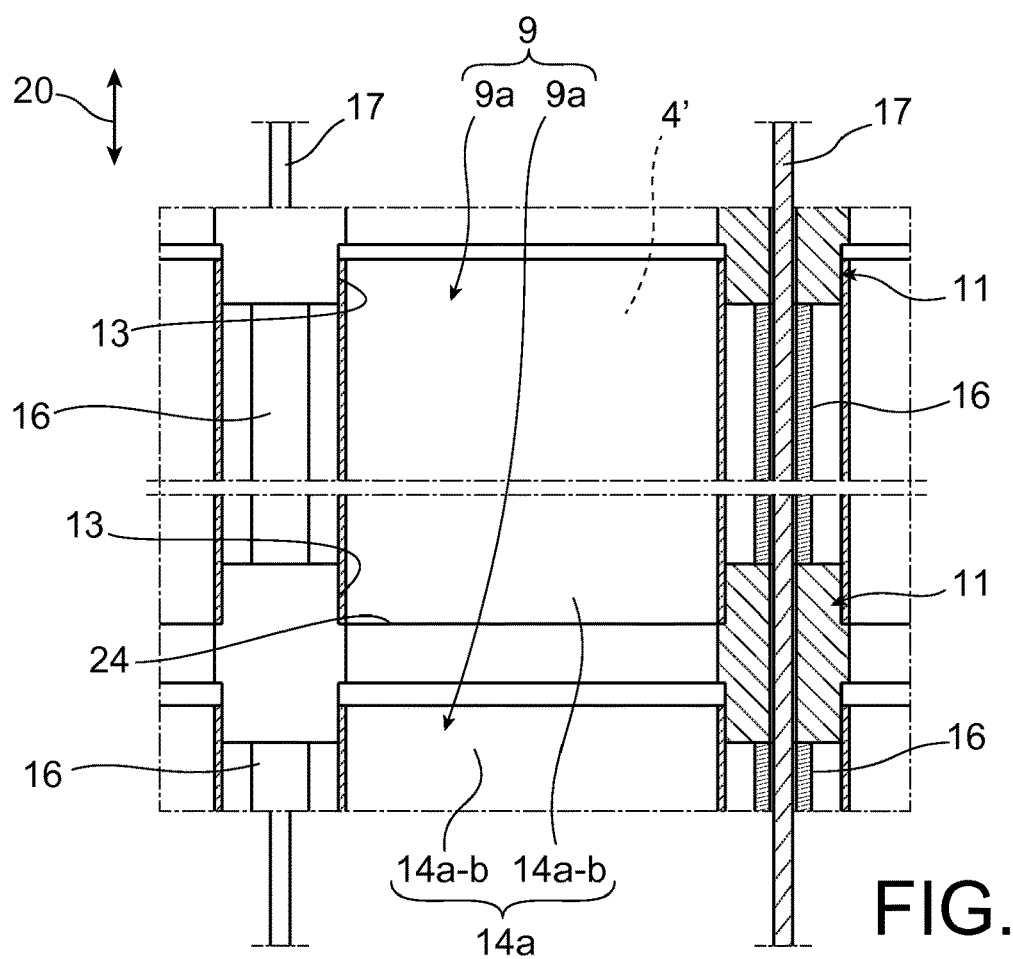
FIG. 7 represents a partial longitudinal cross section view of the storage device being in the form of another alternative embodiment of the invention.

Yet another alternative embodiment is represented in FIG. 7, which can be combined with that of FIG. 6.

In this other embodiment of FIG. 7, the flats 14a, 14b and the sleeves 9 that they form are no longer continuous longitudinally all along the basket, but are cut longitudinally into sections along the direction 20, in order to form adjacent longitudinal sections of sleeve 9a. Each flat is thus cut longitudinally into sections, for example at each wafer 11. In FIG. 7, one of the flats 14a can be seen to be made by the succession of adjacent longitudinal sections of flat 14a-b, each having a lower end axially bearing on a shoulder 24 located inside the opening 13 of the associated wafer 11.

Finally, it is noted that, regardless of the embodiment contemplated, the first flats 14a are preferably the only elements of the basket comprising boron or any other neutron poison element.

Of course, various modifications may be made by the person skilled in the art to the storage devices 1 just described, solely by way of non-limiting examples, the scope of which is defined by the appended claims.

What is claimed is:

1. A storage device for transporting and/or storing nuclear fuel assemblies, the storage device being to be housed in a cavity of a packaging for transporting and/or storing nuclear fuel assemblies, and including a number N of adjacent housings, each being to receive a nuclear fuel assembly, the storage device comprising a plurality of transverse structures spaced apart from each other along a longitudinal direction of the storage device, using a plurality of spacers arranged between these transverse structures, the storage device also comprising sleeves respectively forming the N adjacent housings, each sleeve passing through an opening of at least one of the plurality of transverse structures, each sleeve being made by flat structures along a peripheral direction of the sleeve, each flat structure being parallel to a longitudinal axis of the housing defined internally by the sleeve, wherein in a transverse plane of the storage device passing through the N sleeves, at least one of the N sleeves has an internal housing delimitation surface partly formed by:
an internal surface of a first flat structure thereof made with boron; and
an internal surface of a second flat structure thereof made without boron.

2. The storage device according to claim 1, wherein in the transverse plane of the storage device passing through the N sleeves, at least 30% of the N sleeves each have an internal housing delimitation surface partly formed by:
an internal surface of a first flat structure thereof made with boron; and
an internal surface of a second flat structure thereof made without boron.

3. The storage device according to claim 1, wherein the N sleeves are divided into sleeves delimiting peripheral housings and sleeves delimiting internal housings,
and wherein in the transverse plane of the storage device passing through the N sleeves, at least 50% of the sleeves delimiting peripheral housings each have an internal housing delimitation surface partly formed by:
an internal surface of a first flat structure thereof made with boron; and
an internal surface of a second flat structure thereof made without boron.

4. The storage device according to claim 1, wherein in the transverse plane of the storage device passing through the N sleeves, at least one of the N sleeves has an internal housing delimitation surface having a square or rectangular cross-section, and formed by:
an internal surface of a first flat structure thereof made with boron;
an internal surface of a second flat structure thereof made without boron; and
two other flat structures thereof,
and wherein the first flat structure thereof, the second flat structure thereof, and the other two flat structures thereof respectively form the four sides of the internal housing delimitation surface having a square or rectangular cross-section.

5. The storage device according to claim 4, wherein the internal housing delimitation surface of the at least one of the N sleeves is formed by:
three first flat structures made with boron; or
three second flat structures made without boron; or
two first flat structures made with boron and two second flat structures made without boron.

6. The storage device according to claim 1, wherein the first flat structures forming the N sleeves have a same boron content.

7. The storage device according to claim 1, wherein at least one first flat structure is made in one-piece from an aluminium alloy comprising boron, and/or at least one first flat structure is provided with a coating comprising boron applied to an aluminium alloy material.

8. The storage device according to claim 1, wherein at least one second flat structure is made of a boron-free aluminium alloy.

9. The storage device according to claim 1, wherein the sleeves each extend over the full height of the storage device,
with each flat structure
continuously extending over the full height of the storage device,
or else cut into longitudinal sections to form adjacent longitudinal sections of sleeve.

10. The storage device according to claim 9, wherein each flat structure is cut into longitudinal sections,
and at least one of the longitudinal sections of sleeve is axially bearing on one of the transverse structures of the storage device.

11. The storage device according to claim 1, wherein the transverse structures are wafers each pierced with N openings for receiving the N sleeves, respectively, the wafers being made without boron.

12. The storage device according to claim 1, further comprising tie rods for mechanically holding the stack of transverse structures and spacers along the longitudinal direction.

13. The storage device according to claim 1, wherein the number of transverse structures, longitudinally spaced from each other, is greater than five.

14. A packaging for storing and/or transporting nuclear fuel assemblies, the packaging comprising a cavity in which the storage device according to claim 1 is housed.

15. A package comprising the packaging according to claim 14, as well as nuclear fuel assemblies arranged in the adjacent housings of the storage device of this packaging.

* * * * *